(12) United States Patent
Tisserand et al.

(10) Patent No.: US 8,994,302 B2
(45) Date of Patent: Mar. 31, 2015

(54) REGULATOR/BRUSH-HOLDER ASSEMBLY FOR A MOTOR-VEHICLE ALTERNATOR, MANUFACTURING PROCESS AND CORRESPONDING ALTERNATOR

(75) Inventors: Pierre Tisserand, Limeil Brevannes (FR); Christophe Porte, Levallois Perret (FR); Sebastien Moreau, Creteil (FR); Laurent De Lamarre, Paris (FR); Olivier Grammont, Cerfontaine (FR); Fabrice Sangiovanni, Wimereux (FR); Brice Lecole, Paris (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 17 days.

(21) Appl. No.: 13/514,861

(22) PCT Filed: Dec. 14, 2010

(86) PCT No.: PCT/FR2010/052703
§ 371 (c)(1),
(2), (4) Date: Jul. 17, 2014

(87) PCT Pub. No.: WO2011/073562
PCT Pub. Date: Jun. 23, 2011

(65) Prior Publication Data
US 2013/0009498 A1 Jan. 10, 2013

(30) Foreign Application Priority Data
Dec. 18, 2009 (FR) ...................................... 09 59212

(51) Int. Cl.
*H02P 1/18* (2006.01)
*H02P 3/08* (2006.01)
*H02K 11/02* (2006.01)

(52) U.S. Cl.
CPC .................................. *H02K 11/026* (2013.01)
USPC ............ 318/251; 318/140; 310/64; 310/68 R; 310/68 D; 322/28

(58) Field of Classification Search
USPC ........ 310/64, 68 R, 68 D, 242, 239; 318/251, 318/140; 322/28, 69; 323/201; 361/18, 760, 361/748
See application file for complete search history.

(56) References Cited

U.S. PATENT DOCUMENTS 3,496,394 A * 2/1970 Reichelt et al. ............. 310/68 R
3,553,504 A * 1/1971 Balcke et al. ............... 310/68 D (Continued)

FOREIGN PATENT DOCUMENTS

DE 10 2008 001570 11/2009
EP 1 058 369 12/2000

(Continued)

*Primary Examiner* — Paul Ip
(74) *Attorney, Agent, or Firm* — Berenato & White, LLC

(57) ABSTRACT

The regulator/brush-holder assembly (1) comprises a support (2) and an electrical circuit (5, 6) comprising a regulating element (5) connected by microwires to a trace circuit (6). The electrical circuit further includes a filtering circuit (10) separate from the regulating element and connected by microwires to the trace circuit. According to one particular embodiment, the filtering circuit comprises an insulating substrate (11) and surface-mounted components (C1, C2, S1, S2, V). A ground plane (19) and/or one or more ground pads may be provided for connection to a ground trace of the trace circuit. The filtration frequencies of the filter circuit extend from 100 kHz to 1 GHz.

10 Claims, 3 Drawing Sheets

(56) References Cited

U.S. PATENT DOCUMENTS

| | | | | |
|---|---|---|---|---|
| 4,128,801 A | * | 12/1978 | Gansert et al. | 322/28 |
| 4,128,802 A | * | 12/1978 | Gansert et al. | 322/28 |
| 4,359,656 A | * | 11/1982 | Fasterding et al. | 310/68 R |
| 4,363,083 A | * | 12/1982 | Tanaka et al. | 362/216 |
| 4,413,222 A | * | 11/1983 | Gansert et al. | 322/69 |
| 5,550,415 A | | 8/1996 | Adachi et al. | |
| 5,594,321 A | * | 1/1997 | Kohl et al. | 361/18 |
| 5,998,891 A | * | 12/1999 | Chen et al. | 310/68 R |
| 6,160,333 A | * | 12/2000 | Chen et al. | 310/64 |
| 6,198,191 B1 | * | 3/2001 | Chen et al. | 310/239 |
| 7,116,032 B2 | * | 10/2006 | Kashihara et al. | 310/242 |
| 7,245,111 B2 | * | 7/2007 | Montgomery et al. | 322/45 |
| 7,274,127 B2 | * | 9/2007 | Kashihara et al. | 310/242 |
| 7,538,522 B2 | * | 5/2009 | Lybbert | 322/28 |
| 2006/0097704 A1 | * | 5/2006 | Deverall et al. | 323/201 |
| 2007/0206363 A1 | * | 9/2007 | Cespedes et al. | 361/748 |
| 2007/0285906 A1 | * | 12/2007 | Deverall et al. | 361/760 |

FOREIGN PATENT DOCUMENTS

| | | |
|---|---|---|
| FR | 2 795 880 | 1/2001 |
| GB | 2 091 007 | 7/1982 |

* cited by examiner

REGULATOR/BRUSH-HOLDER ASSEMBLY FOR A MOTOR-VEHICLE ALTERNATOR, MANUFACTURING PROCESS AND CORRESPONDING ALTERNATOR

CROSS-REFERENCE TO RELATED APPLICATIONS AND CLAIM TO PRIORITY

This application is a national stage application of International Application No. PCT/FR2010/052703 filed Dec. 14, 2010, which claims priority to French Patent Application No. 09/59212 filed Dec. 18, 2009, of which the disclosures are incorporated herein by reference and to which priority is claimed.

TECHNICAL FIELD OF THE INVENTION

The present invention relates to a regulator/brush holder for a motor vehicle alternator, and its production method. It also relates to an alternator comprising this distinctive regulator/brush holder.

TECHNOLOGICAL BACKGROUND OF THE INVENTION

Modern alternators for motor vehicles are compact pieces of equipment in which the control and regulating devices are integrated.

It is the brush-holder associated with the collector of the rotor which most often supports the device for regulating the power of the current produced by the alternator, as well as the various anti-parasite means, such as selfs and capacitors.

These active or passive electronic components must be isolated from the severe work conditions under the bonnet of the engine (temperature, vibrations, dust) by a protective housing which is relatively complex to produce.

In order to eliminate this disadvantage, European patent application EP0750388 A1 by the company VALEO EQUIPMENTS ELECTRIQUES MOTEUR proposes to provide the protection of an anti-parasite capacitor directly by over-moulding around the component.

European patent application EP1058369 A1 by the same company shows the arrangement of a semiconductor control component of the "ASIC" type in a brush-holder by implementing a wire bonding technique which has the advantage of isolating the control component from the mechanical and thermal stresses which are sustained by the brush-holder.

In the case of a control circuit which is interfaced with a serial bus of the "LIN" type (acronym for "Local Interconnect Network"), the control line may be subjected to radio-electric disturbances which create operating faults.

On regulators of this type which are sold, with an input capacity of 220 pF for example, operating faults are found starting from injection of disturbance of approximately 10 mW in DPI (an acronym for Direct RF Power Injection).

However, motor vehicle manufacturers require alternators to have strong immunity to radiofrequency disturbances, whilst retaining good operating reliability.

If a single filtering capacitor in parallel is used, the reliability is relatively good, but the immunity is relatively low.

If one to three components are integrated, by an overmoulding technique, such as that demonstrated by application EP0750388 A1, the immunity can be improved, but the components have low tolerance to the injection temperatures and pressures, even with protective caps, to the detriment of reliability.

In the brush-holders of the state of the art of the latest generation, the components are implanted after the overmoulding, but the implantation of more than three components is difficult to carry out.

There is therefore a need fir a new-generation brush-holder which integrates a control and regulating device which has strong immunity to radio-frequency disturbances, and the structure and production method of which guarantee good operating reliability.

For reasons of economies of scale, it is preferable for the technical solution to be suitable for different types of regulators and different connections.

GENERAL DESCRIPTION OF THE INVENTION

The present invention thus relates to a regulator/brush-holder of a motor vehicle alternator of the type comprising:
  a support;
  an electric circuit comprising a regulating element which is connected by wire bonding to a trace circuit,
such as that described in application EP1058369 A1.

In response to the above-described needs, the brush-holder according to the invention is distinguished in that the electric circuit additionally comprises a filtering circuit which is separated from the regulating element and is connected by wire bonding to the trace circuit.

Highly advantageously, the filtering circuit comprises an isolating substrate and surface-mounted components.

According to a particular embodiment, this filtering circuit is a PI filter of the low-pass type fitted in series by wire bonding between a first trace of a control input of the electric circuit, and a second trace of a communication input of the regulating element. It will be appreciated that according to the invention, types of filter other than low-pass can be used in accordance with the filtering needs of the application.

According to another characteristic, the substrate comprises at least one ground-conducting pad, and advantageously has a ground loop which contributes towards the function of transfer of the filter.

According to another characteristic, the filtering circuit of the regulator/brush holder according to the invention, for a motor vehicle alternator, comprises at least one varistor.

The invention also relates to a method for production of the above-described brush-holder, which makes it possible to achieve the objectives of reliability and economies of scale specified.

This method is distinguished in that it comprises:
  a first gluing of the regulating element of a predetermined type on the support by means of a first glue, and of the filtering circuit of a variable type on the trace circuit by means of a second glue, during a first step;
  a first polymerisation of the first and second glues, during a second step;
  wire bonding of the regulating element and the filtering circuit, during a third step;
  covering of the regulating element and the filtering circuit by a gel which can be polymerised, during a fourth step;
  a second polymerisation of the gel, during a fifth step;
  a second gluing of a cap on the regulating element and the filtering circuit by means of a third glue, during a sixth step; and
  a third polymerisation of the third glue during a seventh step.

The first glue is preferably electrically and thermally conductive, and the second glue is advantageously isolating.

It will be appreciated that benefit is derived from the integration of a brush-holder which has the above-described characteristics in a new motor vehicle alternator.

These few essential specifications will have made apparent to persons skilled in the art the advantages provided by this brush-holder in comparison with the prior art.

The detailed specifications of the invention are given in the following description which is provided in association with the attached drawings. It should be noted that these drawings have no purpose other than to illustrate the text of the description, and do not constitute in any way a limitation of the scope of the invention.

DESCRIPTION OF THE PREFERRED EMBODIMENTS OF THE INVENTION

Figure 1:
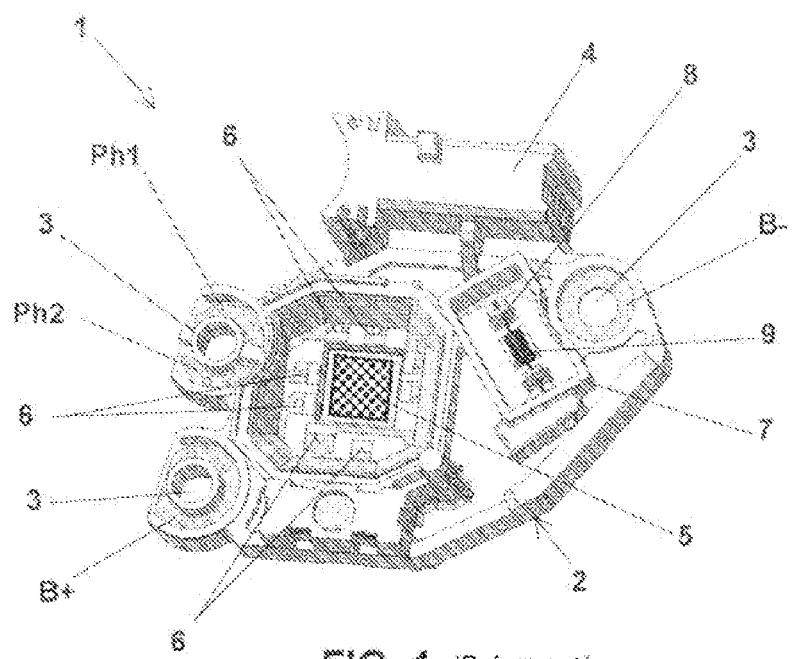
FIG. 1 shows a brush-holder/regulator for a motor vehicle which is known in the prior art.

The type of brush-holder concerned by the invention is shown in FIG. 1.

This brush-holder 1 known in the prior art, and designed for an alternator of a motor vehicle, comprises a support 2 with apertures 3 in lugs to secure it to the housing of the machine, on the rear bearing of the latter.

These lugs incorporate electrical connections to the phases Ph1, Ph2 of the alternator, and the battery B+, B− of the vehicle.

The brush-holder 1 comprises a brush cage 4 containing brushes which are designed to come into contact with the collector of the rotor.

The brush-holder 1 comprises a semiconductor control and regulating components 5 of the "ASIC" or hybrid type, which is secured by means of a thermally conductive glue to the support 2 in a receptacle.

This component is connected by wire bonding (not represented) to a trace circuit 6.

The electric circuit formed by the component 5 and the trace circuit 6 communicates with the control unit of the vehicle by means of a connector 7.

This connector comprises in particular a communication line 8 of a LIN communication bus which can be subjected to radio-electric disturbances.

The effect of these disturbances is attenuated, according to a known solution, by means of a capacitor 9 which is arranged between the communication line 8 and the ground, as shown clearly in FIG. 1.

Figure 2:
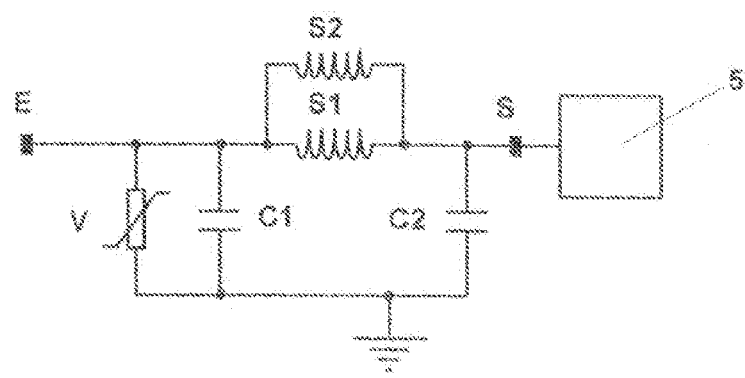
FIG. 2 is the wiring diagram of a PI low-pass filter according to the prior art, of the type concerned by the invention.

In this particular embodiment, the attenuation can be improved by using a PI low-pass filter comprising three to five components, the wiring diagram of which is shown in FIG. 2. It will be noted that, according to the invention, other types of filter can be used according to the particular filtering needs of the application, for example filters of the Γ or T or L type, which are not exclusively low-pass, including R, L, C filters (R for "resistive component", L for "inductive component", and C for "capacitive component"). In general, the filter used will preferably, but not exclusively, comprise one to five components.

In the filter in FIG. 2, the input E of the filter is connected to the control input of the electric circuit 5, 6, and the output S is connected to the communication input of the regulating component 5. Two capacitors C1, C2 connect respectively the input E and the output S of the filter to the ground, whereas a self S1 is inserted in series in the communication input.

As an option, a second self S2 is provided, fitted in parallel with the first S1.

Preferably, as a variant, a varistor V in parallel on the input E advantageously clips the peaks of the excess voltages which are present on the control line 8.

Tests carried out by the inventor company have shown that a PI filter such as shown in FIG. 2 is efficient for DPI injections of up to 5 W.

Figure 3:
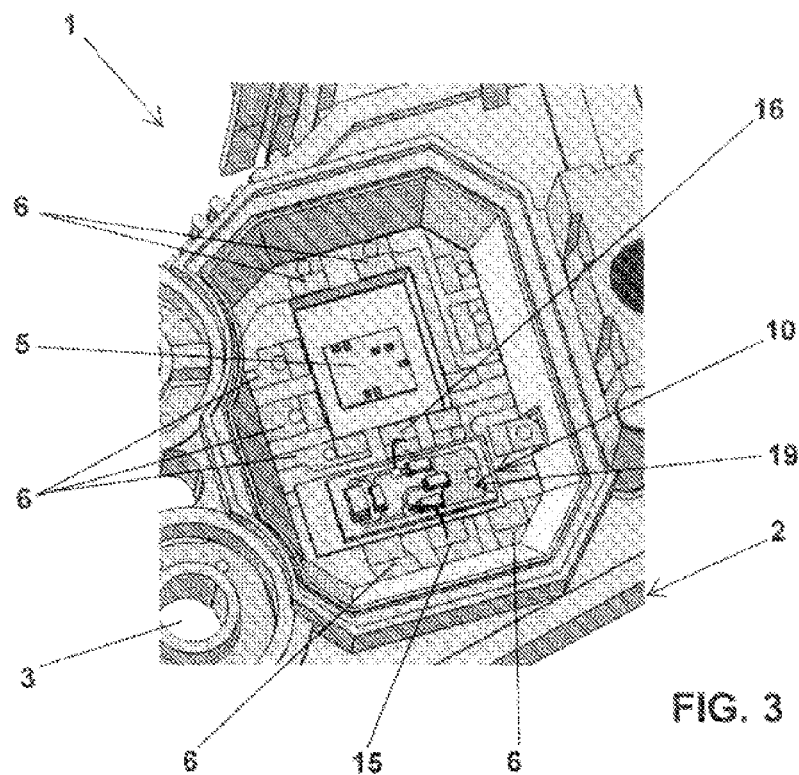
FIG. 3 shows a brush-holder/regulator for a motor vehicle according to the invention.

FIG. 3 shows the integration of a filtering circuit 10 which implements the wiring diagram in FIG. 2 in the brush-holder 1 according to the invention.

In a preferred embodiment of the invention, this filtering circuit 10 is in the form of a module constituted by an isolating substrate 11 which supports surface-mounted components (CMS). In this particular embodiment, a ground plane 19, shown in FIG. 3 is also provided, and participates in the establishment of the performance required for this filter.

Figure 4:
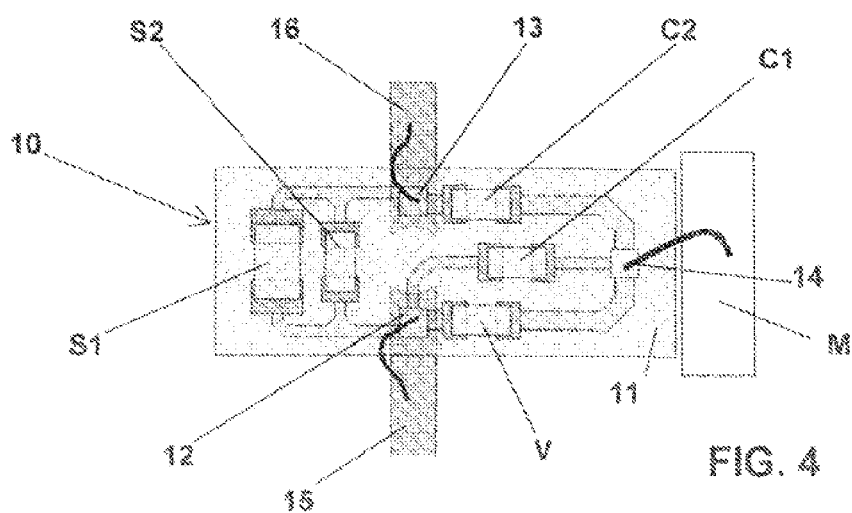
FIG. 4 is a partial view of the brush-holder/regulator for a motor vehicle according to the invention in FIG. 3, showing the wire bonding of the filtering circuit.

As shown clearly in FIG. 4, for one embodiment without a ground plane 19, in this case the substrate 11 comprises conductive pads 12, 13, which permit the connection by wire bonding of the input E of the filtering circuit 10 firstly to a first trace 15 of a control input of the electric circuit 5, 6, and secondly to a second trace 16 of a communication input of a regulating element 5.

At least one ground pad 14 permits connection by wire bonding of the module 10 to a ground M of the electric circuit 5, 6.

Figure 5A:
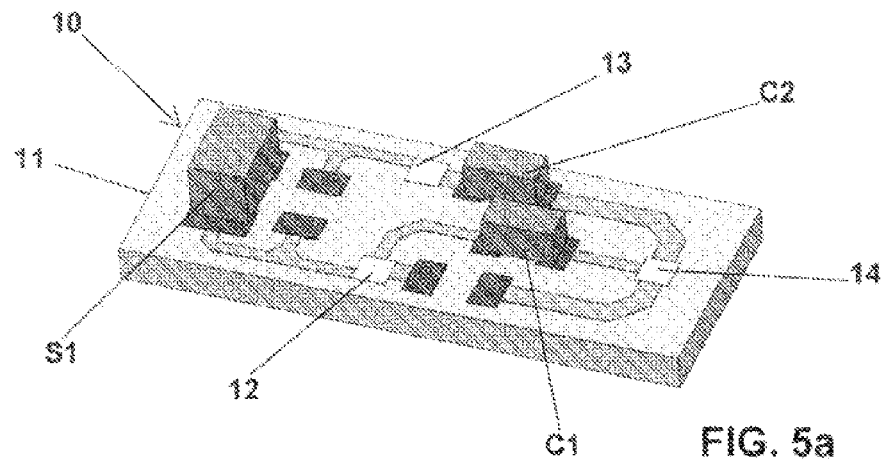
FIGS. 5a to 5c show variant embodiments of the filtering circuit of the brush-holder/regulator for a motor vehicle according to the invention.

FIG. 5a shows a filtering circuit 10 which comprises only the three components C1, C2, S1 which are necessary in order to constitute a PI filter.

Figure 5B:
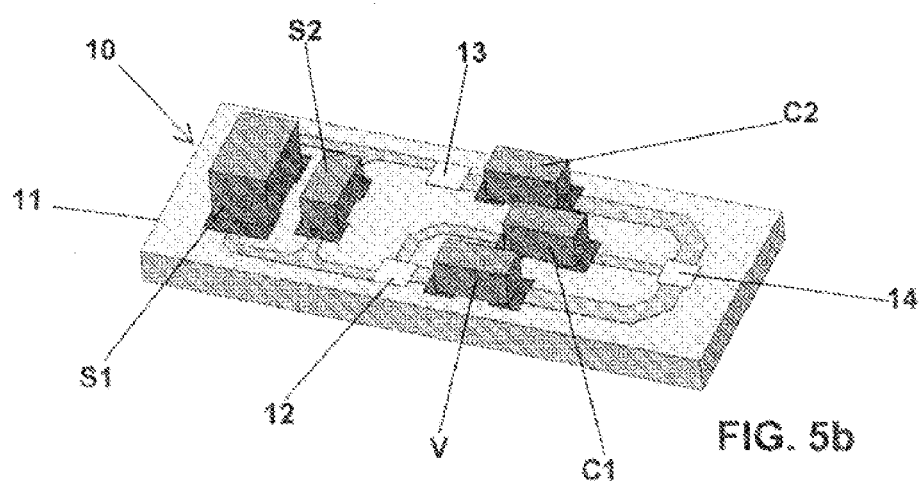

FIG. 5b shows a filtering circuit 10 comprising the second optional self S2 and the variant comprising a varistor V.

In the implementations of the filter shown in FIGS. 5a and 5b, the substrate 11 comprises only a single ground pad 14.

Figure 5C:
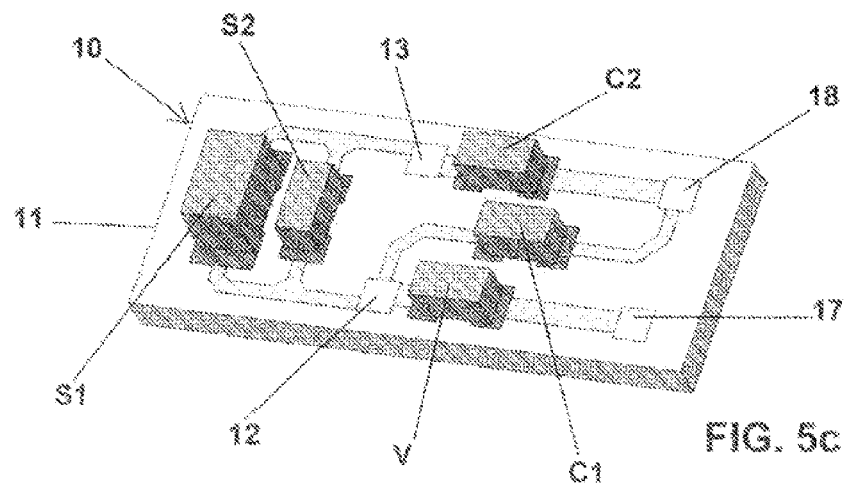

On the other hand, in another preferred embodiment of the invention, the substrate 11 shown in FIG. 5c comprises two ground pads 17, 18 which create a ground loop which contributes towards the transfer function of the filter, according to the thickness of the traces.

The substrate 11 is preferably a rectangular plate approximately 12.5 mm by 5 mm, and approximately 0.8 mm thick.

In order to obtain preferably filtering of the frequencies contained, between 100 KHz and 1 GHz, the capacitors C1, C2 have a capacity contained between, 1 pF and 100 nF, and the selfs S1, S2 have an inductance contained between 0.01 µH and 100 µH.

The design of the filtering circuit 10 in the form of a module separate from the regulating element 5 makes it possible to retain regulating elements of a predetermined type, and to adapt the regulator/brush-holder 1 to the constraints of immunity required, by associating with it a filtering circuit 10 of a variable type, by means of the number of components in particular, which have appropriate characteristics.

This results in economies of scale, and consequently a competitive advantage.

The method for production of the brush-holder according to the invention is compatible with this design, and minimises the assembly steps.

In a first step, use is made of glues which have identical polymerisation characteristics in order to secure the regulating element 5 and the filtering circuit 10, so as proceed with their first polymerisation simultaneously (preferably by gradually increasing the temperature to 200° C.) in a second step.

Since the regulating element 5 is habitually wire bonded, the filtering circuit 10 is neither welded nor brazed, but is also wire bonded during a single third step.

The method for production of the brush-holder 1 according to the invention is continued by applying to the assembly constituted by the regulating element 5 and the filtering circuit 10 the steps of integration of a habitual regulating and control element 5:

- covering with a gel which can be polymerised during a fourth step;
- second polymerisation of the gel during a fifth step, preferably at 160° C.
- gluing of a cap during a sixth step;
- third polymerisation (preferably at 160° C.) to complete the gluing of the cover in a seventh step.

As well as the simplification of the production of the brush-holder 1, the method for connection by wire bonding of the filtering circuit 10 makes it possible to eliminate the known disadvantages of use of over-moulded components.

It will be appreciated that the invention is not limited to the above-described preferred embodiments.

On the contrary, it incorporates all the variant embodiments possible.

In particular, the type of filter of the filtering circuit 10, the number and type of components specified in the description, their arrangement on the substrate 11, and the values of capacity and inductance specified, are not in any way limiting.

According to the invention, L filters, T filters, or a plurality of PI filter cells can be implemented in the brush-holder 1 according to the ranges of frequencies to be filtered, provided that the characteristics of the brush-holder 1 do not depart from the scope established by the following claims.

Finally, benefit will be derived from implementation of the brush-holder 1 according to the invention not only in alternators as previously described, but also in alternator-starters and other similar electrical equipment with communications lines which are subjected to radio-electric disturbances.

The invention claimed is:

1. A brush-holder (1) for a motor vehicle alternator, comprising:
    a support (2) comprising a brush cage (4) for receiving brushes of the alternator; and
    an electric circuit formed on said support (2), said electric circuit comprising a trace circuit (6), a regulating element (5) connected by wire bonding to said trace circuit (6) and a filtering circuit (10) separated from said regulating element (5) and connected by wire bonding to said trace circuit (6);
    said filtering circuit (10) comprising an isolating substrate (11) mounted to said support (2) and at least one of surface-mounted components (C1, C2, S1, S2, V), a ground plane (19) and at least one ground pad (14, 17, 18) for connection to a ground trace (M) of the trace circuit (6);
    said surface-mounted components (C1, C2, S1, S2, V), said ground plane (19) and said at least one ground pad (14, 17, 18) being mounted to said isolating substrate (11).

2. The brush-holder (1) according to claim 1, wherein said filtering circuit (10) is a low-pass PI filter fitted in series by wire bonding between a first trace (15) of a control input of said electric circuit, and a second trace (16) of a communication input of said regulating element (5); said first trace (15) and said second trace (16) being mounted to said support (2).

3. The brush-holder (1) according to claim 2, wherein said isolating substrate (11) comprises said at least one ground-conducting pad (14, 16, 17).

4. The brush-holder (1) according to claim 3, wherein said isolating substrate (11) has a ground loop which contributes to the transfer function of said filter.

5. The brush-holder (1) according to claim 2, wherein said filtering circuit comprises capacitors (C1, C2) with a capacity contained between, 1 pF and 100 nF, and inductance selfs (S1, S2) with inductance contained between 0.01 µH and 100 µH, and wherein the filtering frequencies of said filter extend from 100 KHz to 1 GHz; said capacitors (C1, C2) and said inductance selfs (S1, S2) being mounted to said isolating substrate (11).

6. A motor vehicle alternator comprising a brush-holder (1) according to claim 2.

7. A motor vehicle alternator comprising a brush-holder (1) according to claim 1.

8. The brush-holder (1) according to claim 1, wherein said filtering circuit (10) comprises at least one varistor (V).

9. A method for production of a brush-holder (1) for a motor vehicle alternator, comprising:
    a support (2); and
    an electric circuit formed on said support (2), said electric circuit comprising a trace circuit (6), a regulating element (5) connected by wire bonding to a trace circuit (6) and a filtering circuit (10) separated from said regulating element (5) and connected by wire bonding to said trace circuit (6);
    said method comprising the steps of:
        gluing said regulating element (5) on said support (2) by means of a first glue, and said filtering circuit (10) of a variable type on said trace circuit (6) by means of a second glue;
        forming said trace circuit (6) on said support (2);
        polymerizing said first and second glues;
        wire bonding said regulating element (5) and said filtering circuit (10);
        covering said regulating element (5) and said filtering circuit (10) by a gel which can be polymerized;
        polymerizing said gel;
        gluing a cap on said regulating element (5) and said filtering circuit (10) by means of a third glue; and
        polymerizing said third glue.

10. The method for production of the brush-holder (1) according to claim 9, wherein said first glue is electrically and thermally conductive, and the second glue is isolating.

* * * * *